United States Patent [19]

Shimizu

[11] Patent Number: 4,671,372
[45] Date of Patent: Jun. 9, 1987

[54] MOTOR-DRIVEN POWER STEERING UNIT
[75] Inventor: Yasuo Shimizu, Tochigi, Japan
[73] Assignee: Honda Giken Kogyo Kabushiki Kaisha, Tokyo, Japan
[21] Appl. No.: 786,038
[22] Filed: Oct. 10, 1985
[30] Foreign Application Priority Data Oct. 11, 1984 [JP] Japan .................. 59-212911

[51] Int. Cl.4 ............................. B62D 5/04
[52] U.S. Cl. .............. 180/79.1; 74/388 PS; 180/142; 310/DIG. 6
[58] Field of Search ............ 180/79.1, 79.3, 141, 180/142; 310/DIG. 6; 74/388 PS

[56] References Cited

U.S. PATENT DOCUMENTS

| | | | |
|---|---|---|---|
| 2,754,465 | 7/1956 | Brier | 180/79.1 |
| 3,023,335 | 2/1962 | Burr | 310/DIG. 6 |
| 4,448,275 | 5/1984 | Kitugawa | 180/79.1 |
| 4,530,413 | 7/1985 | Buike | 180/79.1 |
| 4,561,515 | 12/1985 | Hashimoto | 180/79.1 |
| 4,577,712 | 3/1986 | Norton | 180/79.1 |

FOREIGN PATENT DOCUMENTS 0177773  10/1983  Japan .................. 180/79.1

Primary Examiner—John J. Love
Assistant Examiner—Mitchell J. Hill
Attorney, Agent, or Firm—Armstrong, Nikaido, Marmelstein & Kubovcik

[57] ABSTRACT

A motor-driven power steering unit which can easily be added to an automobile. The motor-driven power steering unit includes a case fixed to the automobile body. A first shaft rotatably is supported in the case and has one end connected to a first lever for being operatively coupled to the steering wheel. A second shaft is rotatably supported in the case coaxially with the first shaft and has one end connected to a second lever for being coupled to the tie rods. A torsion bar is interposed between the first and second shafts and interconnects the first and second shafts. The power steering unit also includes a torque detecting mechanism interposed between the first and second shafts for detecting the steering torque applied from the steering wheel to the first shaft to generate a signal indicative of the detected torque. A motor is disposed in the casing for applying an assistive torque to the second shaft a power supply energizes the motor. A control circuit is responsive to the signal from the torque detecting mechanism for controlling the torque generated by the motor.

3 Claims, 5 Drawing Figures

MOTOR-DRIVEN POWER STEERING UNIT

BACKGROUND OF THE INVENTION

The present invention relates to a power steering system, and more particularly to a power steering system driven by an electric motor.

Known motor-driven power steering systems are composed of an electric motor for applying assistive power to the linkage of the power steering system to assist in steering operation, a power supply for energizing the electric motor, a detector for detecting the steering torque imposed on the steering wheel and generating a signal representative of the detected steering torque, and a control circuit responsive to the output signal from the detector for controlling the current supplied from the power supply to the motor.

In order to install these components on the steering linkage, it is necessary to design the elements of the steering linkage into configurations suitable for association with the components. Where a power steering system is to be added to an existing motor vehicle such as an automobile which has been manufactured without any power steering system, the steering linkage has to be substantially modified.

SUMMARY OF THE INVENTION

It is an object of the present invention to provide a motor-driven power steering unit which allows a power steering system to be added to a motor vehicle through only a slight modification of the steering linkage thereof.

Another object of the present invention is to provide a motor-driven power steering unit which is suitable especially for use in a motor vehicle having a center-arm-type steering linkage.

According to the present invention, there is provided a motor-driven power steering unit for use in a motor vehicle having a body, a steering wheel, steerable wheels, and a steering linkage including tie rods coupled to the steerable wheels and interconnecting the steering wheel and the steerable wheels. The motor-driven power steering unit includes a case fixed to the body, a first shaft rotatably supported in the case and having one end connected to a first lever for being operatively coupled to the steering wheel, a second shaft rotatably supported in the case coaxially with the first shaft and having one end connected to a second lever for being coupled to the tie rods, and a torsion bar interposed between the first and second shafts and interconnecting the first and second shafts. The power steering unit also includes torque detecting means interposed between the first and second shafts for detecting the steering torque applied from the steering wheel to the first shaft to generate a signal indicative of the detected torque, a motor disposed in the casing for applying an assistive torque to the second shaft, a power supply for energizing the motor, and a control means responsive to the signal from the torque detecting means for controlling the torque generated by the motor.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
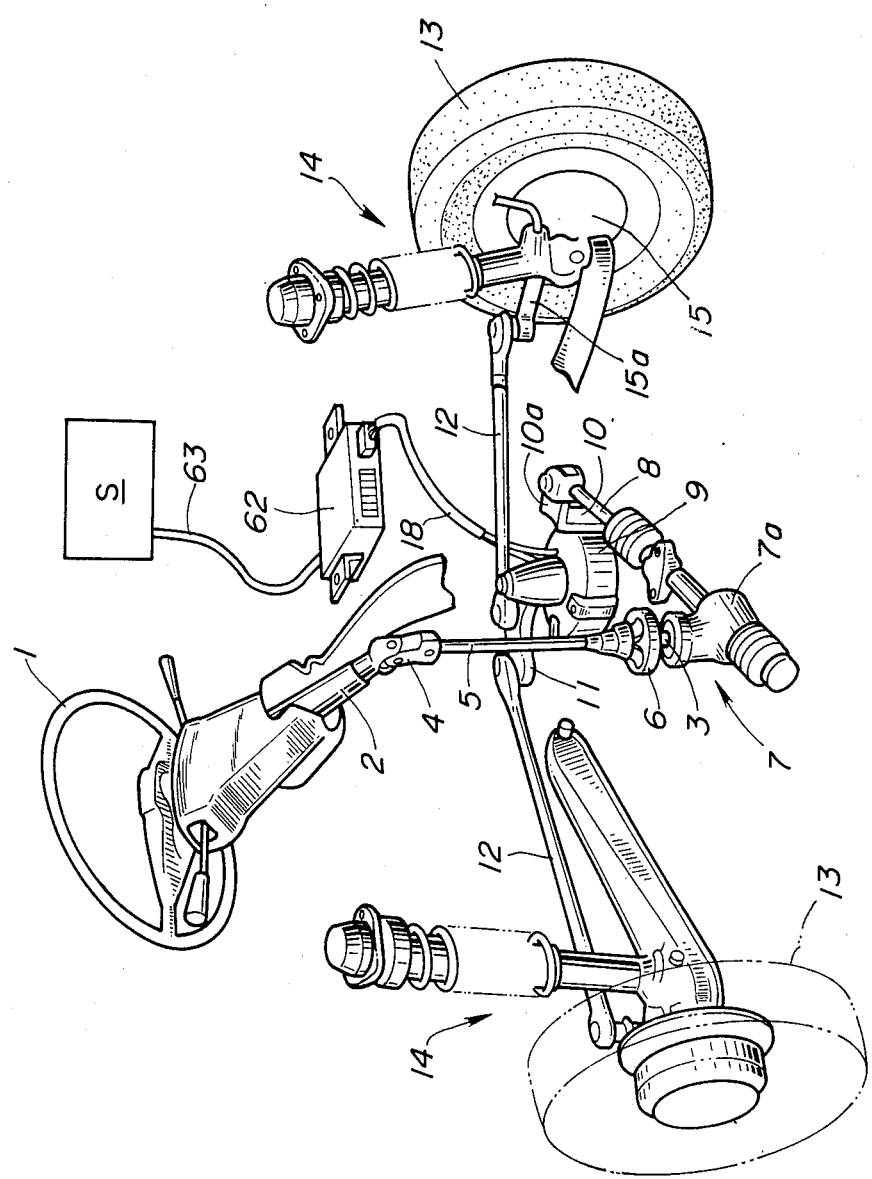
FIG. 1 is a perspective view of a power steering system incorporating a motor-driven power steering unit according to an embodiment of the present invention.

FIG. 1 shows a power steering system incorporating a motor-driven power steering unit according to the present invention. The power steering system has a steering column 2 fixed to an automobile body (not shown) with a steering shaft (not shown) being rotatably supported in the steering column 2. A steering wheel 1 is coupled to one end of the steering shaft. Although the automobile body is omitted from illustration in FIG. 1 for the purpose of clearly showing the components of the power steering system, some of the components are fixed to or supported on the automobile body, as described later on. The other end of the steering shaft is coupled through a joint 4 to the upper end of a vertical shaft 5, the lower end of which is coupled by a rubber joint 6 to the upper end of a pinion shaft 3 projecting from the housing 7a of a gear box 7 fixed to the automobile body.

In the housing 7a of the gear box 7, there is disposed a rack and pinion mechanism composed of a rack shaft axially slidably supported in the housing 7a and a pinion defined on the lower end of the pinion shaft 3 and held in mesh with the rack of the rack shaft. Since the rack and pinion mechanism is of a known structure, it is not illustrated.

The steering torque manually applied to the steering wheel 1 is transmitted smoothly to the rack shaft in the gear box 7. Therefore, the rack shaft is axially movable in response to rotation of the steering wheel 1.

A pair of front wheels 13 is carried on respective knuckles 15 which are steerably supported on the automobile body by means of a pair of respective suspensions 14. Each of the knuckles 15 has a knuckle arm 15a with its distal end pivotally coupled to the outer end of a tie rod 12.

Figure 2:
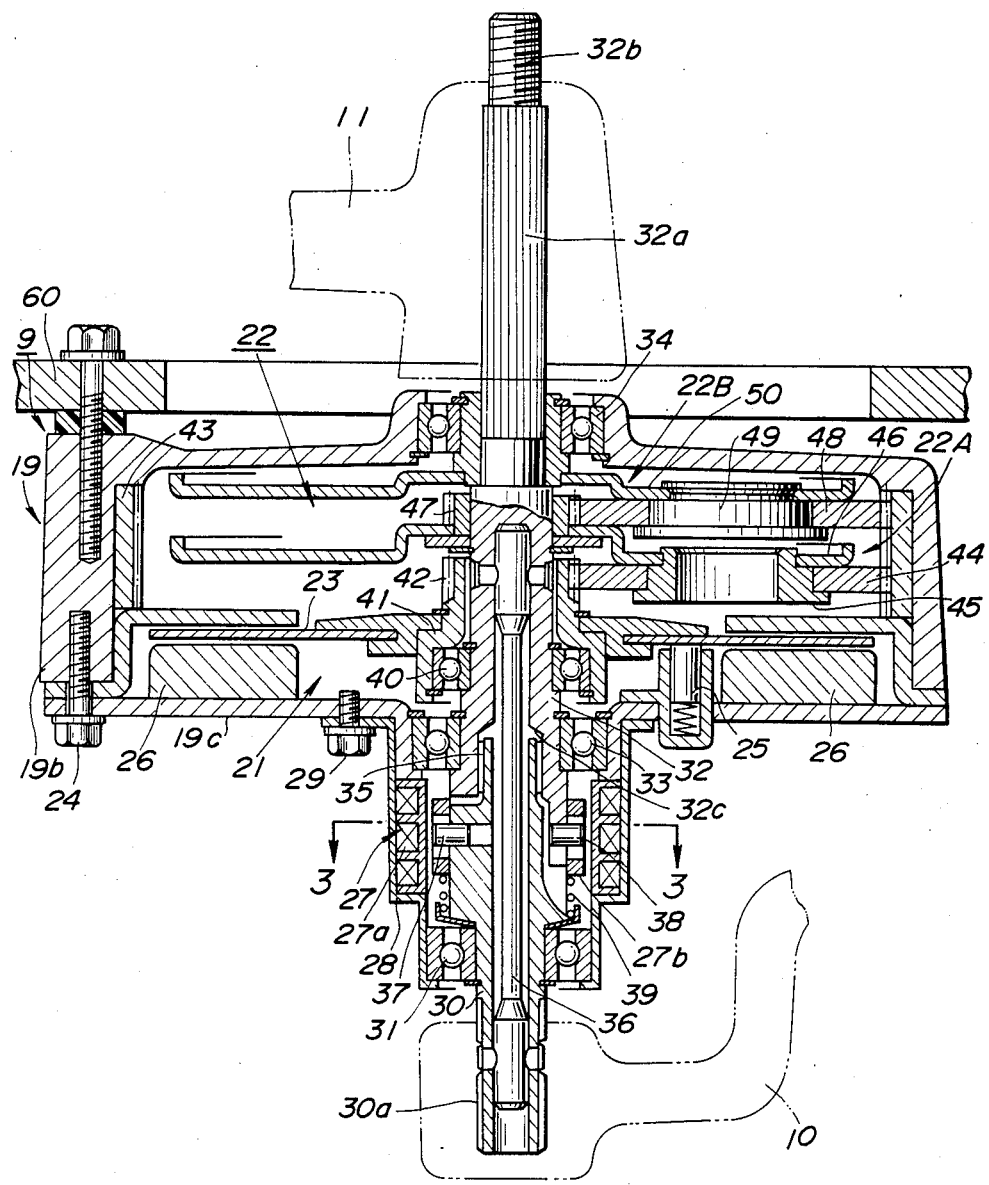
FIG. 2 is a vertical cross-sectional view of a drive force generator in the power steering unit shown in FIG. 1.

A drive force generator 9 is fixed to the automobile body in substantial alignment with the axial center line of the automobile body. As shown in FIG. 2, the drive force generator 9 has a first shaft 30 having a downwardly projecting end and a second shaft 32 having an upwardly projecting end, and also contains a torque detector and an electric motor. The drive force generator 9 has its case secured to the automobile body, denoted at 60 in FIG. 2. A crank-shaped first lever 10 is secured to the first shaft 30 and includes an upper member 10a (FIG. 1) to which one end of a drag link 8 is pivotally coupled. The other end of the drag link 8 is pivotally coupled to an end of the rack shaft in the gear box 7. A second lever 11 is fixed to the second shaft 32 and has a T-shaped end to which the inner ends of the tie rods 12 are pivotally coupled.

Figure 4:
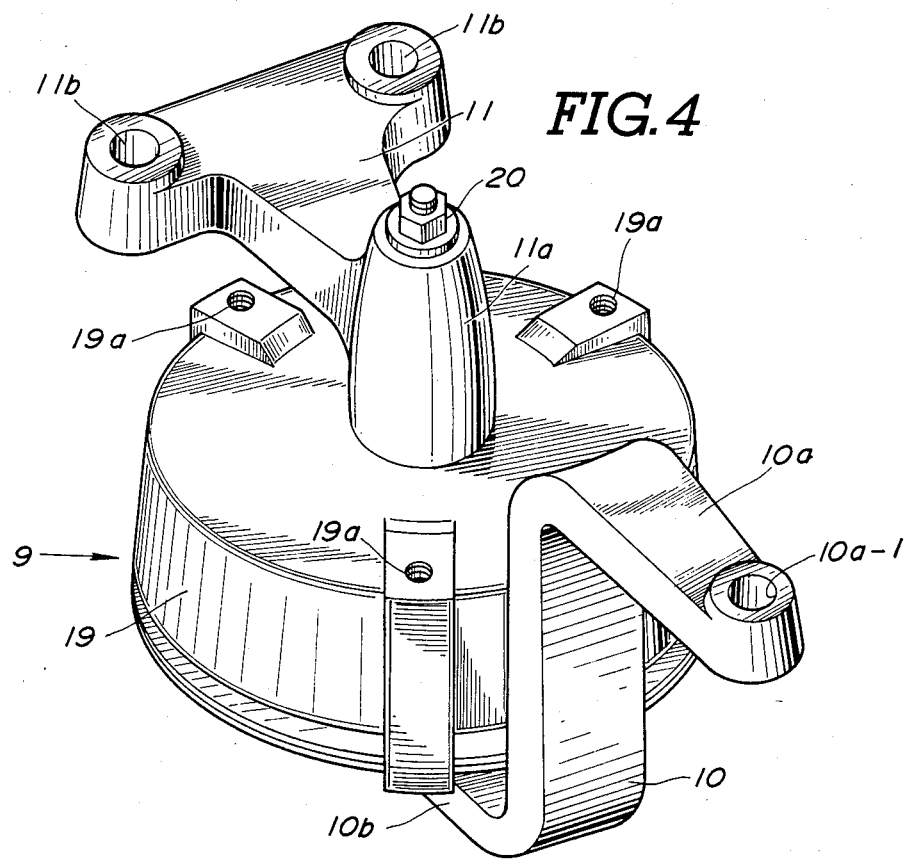
FIG. 4 is a perspective view of the drive force generator.

As illustrated in FIG. 4, the case, denoted at 19, of the drive force generator 9 is of a flat cylindrical shape housing wherein the downwardly projecting first shaft, the upwardly projecting second shaft coaxial therewith, the torque detector interposed between the first and second shafts, and the electric motor and a speed reducer which are disposed around the second shaft. The case 19 has three axial threaded holes for attachment to the automobile body. The upper member 10a of the first lever 10 has a hole 10a-1 through which the first lever 10 is pivotally coupled to the drag link 8. The first lever 10 also has a lower member 10b fixed to the first shaft. The second lever 11 has an end 11a fitted through serrations over the second shaft and fixed thereto by a nut 20, and holes 11b defined in its T-shaped end and through which the inner ends of the tie rods 12 are pivotally coupled to the second lever 11.

The internal structure of the drive force generator 9 will be described in greater detail with reference to FIG. 2.

The motor, denoted at 21, disposed in the drive force generator 9 comprises an axially flat motor such as a disc-shaped printed-coil motor, as shown, having an armature comprising a spiral conductor printed on a thin insulating board 23.

The case 19 is composed of a body 19b having an open bottom accommodating therein a speed reducer 22 and the armature board 23, and a bottom plate 19c fastened to the body 19b by bolts 24 and supporting a brush 25 and magnets 26, and a tubular casing 28 fixed by bolts 29 to the lower surface of the bottom plate 19c and housing the torque detector which comprises a differential transformer 27.

The first shaft 30 has serrations 30a around its lower end and is rotatably supported by a bearing 31 fixedly mounted in the tubular casing 28. The first lever 10 is fixed to the serrations 30a of the first shaft 30. The second shaft 32 is rotatably supported by a bearing 33 fixedly mounted in the central tubular body of the bottom plate 19c, and also by a bearing 34 fixedly mounted centrally in the upper plate of the body 19b of the case 19. The upper portion of the second shaft 32 projects upwardly beyond the upper plate of the body 19b and has serrations 32a therearound and an externally threaded upper end 32b over which the nut 20 is threaded. The end 11a of the second lever 11 is fitted over the serrations 32a.

The first shaft 30 of the drive force generator 9 serves as an input shaft and the second shaft 32 thereof serves as an output shaft.

Figure 3:
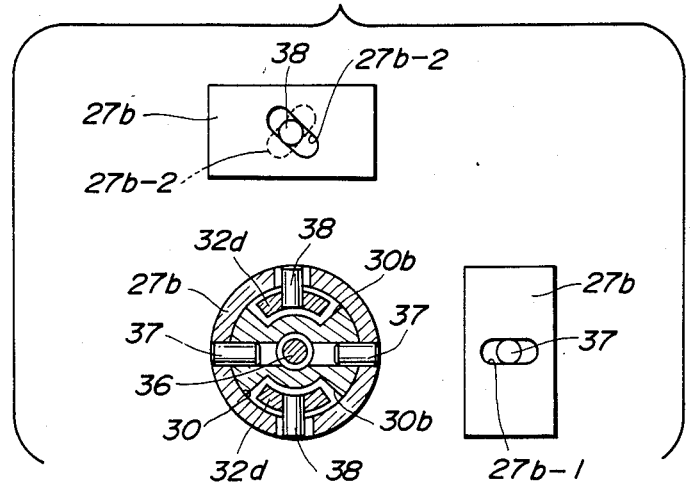
FIG. 3 is a set of cross-sectional, plan, and side elevational views of the moving core of a differential transformer in the drive force generator shown in FIG. 2, the cross-sectional view being taken along line 3—3 of FIG. 2.

The end of the second shaft 32 which confronts the end of the first shaft 30 has an axial hole 32c in which the end of the first shaft 30 is fitted through a needle bearing 35. Thus, the first and second shafts 30, 32 are rotatable relatively to each other. As shown in FIG. 3, the first shaft 30 has a pair of diametrically opposite recesses 30b in which there is fitted a pair of diametrically opposite projections 32d on the end of the second shaft 32, for thereby limiting the relatively angular displacement of the shafts 30, 32 to a certain angular range. Between the coaxial first and second shafts 30, 32, there is disposed a torsion bar 36 extending coaxially therewith and connecting the first and second shafts 30, 32.

Figure 5:
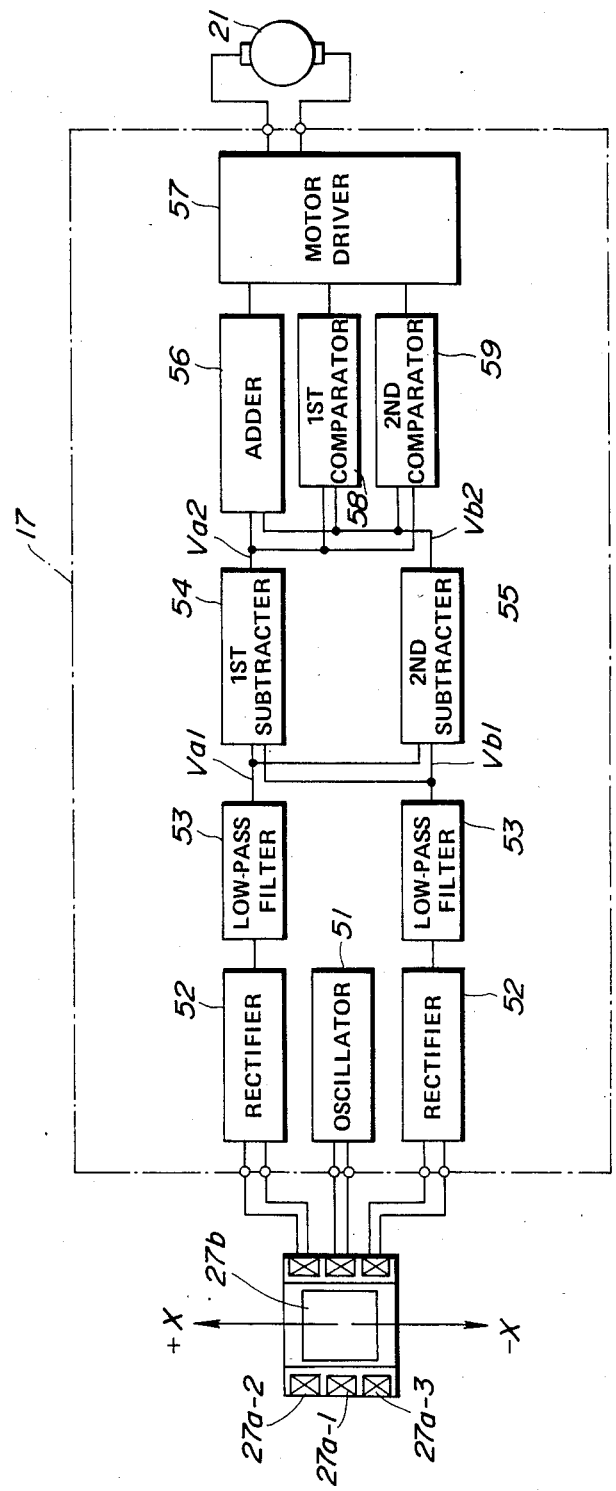
FIG. 5 FIG. 5 is a block diagram of a control circuit provided in the power steering unit of FIG. 1.

The differential transformer 27 has a coil 27a fixed to the inner surface of the tubular casing 28 and a moving core 27b axially slidably disposed in the coil 27a and around the coupled ends of the first and second shafts 30, 32. As shown in FIG. 5, the coil 27a is composed of a primary winding 27a-1 and a pair of secondary windings 27a-2, 27a-3 disposed one on each side of the primary winding 27a-1 and having the same dimensions. As shown in FIG. 3, the moving core 27b is of a tubular shape having a pair of axially parallel slots 27b-1 receiving pins 37, respectively, fixed to the first shaft 30 and a pair of inclined slots 27b-2 receiving pins 38, respectively, fixed to the second shaft 32. When there is a relative angular displacement between the first and second shafts 30, 32, the moving core 27b is axially displaced dependent on the direction of rotation of the first shaft 30 and the relatively angular displacement. The moving core 27b is normally urged axially by a coil spring 39 for preventing any backlash.

The armature board 23 is disposed closely to the magnets 26 and is rotatably supported by a bearing 40 on the second shaft 32. The armature board 23 has a central tubular shaft 41 retaining the bearing 40.

The speed reducer 22 is composed of two planetary gear mechanisms 22A, 22B sharing an internal gear 43 fixed to the inner peripheral surface of the case body 19b. The first planetary gear mechanism 22A includes a sun gear 42 defined on the outer circumference of the tubular shaft 41 of the armature board 23, planet gears 44 held in mesh with the sun gear 42 and the internal gear 43, and a first carrier 46 on which the planet gears 44 are rotatably mounted by respective shafts 45 and which are rotatably supported on the second shaft 32. Similarly, the second planetary gear mechanism 22B includes a sun gear 47 defined on the outer circumference of a tubular shaft of the first carrier 46, planet gears 48 held in mesh with the sun gear 47 and the internal gear 43, and a second carrier 50 on which the planet gears 48 are rotatably mounted by respective shafts 49 and which are rotatably supported on the second shaft 32.

The structure and operation of a control circuit 17 will be described with reference to FIG. 5. When the steering wheel 1 is rotated clockwise and counterclockwise, the moving core 27b of the differential transformer 27 is displaced in the directions $+X$ and $-X$, respectively. An AC voltage is applied from an oscillator 51 to the primary winding 27a-1 to induce voltages across the secondary windings 27a-2, 27a-3. The magnitudes of the induced voltages are dependent on the position of the moving core 27b in the coil 27a. When the moving core 27b is in its central position, the voltages induced across the secondary windings are equal to each other. Currents flowing through the secondary windings 27a-2, 27a-3 are rectified and smoothed by respective rectifiers 52 and lowpass filters 53 which issue output signals Va1, Vb1 to first and second subtractors 54, 55 respectively. The first and second subtractors 54, 55 process the applied signals to produce differences between these signals. More specifically, the first subtracter 54 generates an output signal Va2 equal to Va1-Vb1, and the second subtracter 55 generates an output signal Vb2 equal to Vb1-Va1. Suitable bias voltages are applied to components of the subtractors 54, 55 such that the output signals from the subtractors 54, 55 will be of a zero value if the signal differences are negative. As a result, the output signal Va2 of the first subtracter 54 is proportional to the magnitude of the steering torque at the time the steering wheel is turned clockwise, and coversely, the output signal Vb2 of the second subtracter 55 is proportional to the magnitude of the steering torque at the time the steering wheel is turned counterclockwise.

The output signals Va2, Vb2 are added by an adder 56 which applies a signal to a motor driver 57 for controlling the armature current of the motor 21. The output signals Va2, Vb2 are also applied to first and second comparators 58, 59 which compare the magnitudes of the output signals Va2, Vb2 for detecting the direction in which the steering wheel is steered. More specifically, the steering torque is produced clockwise when Va2>Vb2 and the output of the first comparator 58 is high, and the steering torque is produced counterclockwise when Vb2>Va2 and the output of the second comparator 59 is high. When the outputs from the first and second comparators 58, 59 are low at the same time, the steering wheel is not steered. The output signals from the first and second comparators 58, 59 are applied to the motor driver 57 as signals for determining the direction in which the armature current is to flow.

Therefore, the magnitude and direction of the assistive torque generated by the motor 21 can be controlled by the output signals from the adder 56 and the comparators 58, 59 dependent on the magnitude and direction of the steering torque exerted to the steering wheel.

As shown in FIG. 1, the control circuit is accommodated in a box 62 and connected through a cable 18 to the motor and the torque detector. The control circuit is also connected through another cable 63 to a motor power supply S.

In operation, when the steering wheel 1 is turned, the first lever 10 is operated through the rack and pinion mechanism and the drag link 8 to rotate the first shaft 30, thus producing a relative angular displacement between the first and second shafts 30, 32. The torsion bar 36 interposed between the first and second shafts 30, 32 is subject to a torsional force proportional to the relative angular displacement between the first and second shafts 30, 32. The rotational torque applied from the steering wheel 1 to the first shaft 30 is substantially proportional to the steering wheel exerted manually to the steering wheel 1, and is in balance with the tortional force. Therefore, the relative angular displacement between the first and second shafts 30, 32 depends on the magnitude of the steering torque applied to the steering wheel 1. As a consequence, the axial displacement of the moving core 27b of the differential transformer 27 is commensurate with the magnitude of the steering torque applied to the steering wheel 1. The direction and magnitude of the displacement of the moving core 27b is converted by the differential transformer 27 into an electric signal which is applied to the control circuit 17 that electrically detects the direction and magnitude of the steering torque applied to the steering wheel 1.

The steering torque transmitted from the steering wheel 1 to the first shaft 30 is transmitted via the torsion bar 36 to the second shaft 32. At the same time, the control signal is fed from the control circuit 17 to the motor driver 57 to enable the motor 21 to generate an assistive torque dependent on the direction and magnitude of the steering torque manually applied to the steering wheel 1. The assistive torque thus generated assists in rotating the second shaft 32.

The center arm of a center-arm-type steering linkage in an automobile having no power steering system may be replaced with the motor-driven power steering unit of the invention to provide a motor-driven power steering system in the automobile. Therefore, an inexpensive motor-driven power steering system can easily be added to such an automobile. Inasmuch as the motor 21 is of a flat configuration such as a disc-shaped printed-coil motor having small axial dimensions and a small armature mass, the drive force generator is small in size and lightweight, and is highly responsive in the generation of assistive torques.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-driven power steering unit for use in a motor vehicle said motor-driven power steering unit comprising:

a body, a steering wheel, steerable wheels, and a steering linkage including tie rods coupled to said steerable wheels and interconnecting said steering wheel and said steerable wheels, said steering linkage further including a steering shaft rotating in unison with said steering wheel, a drag link operatively coupled to said steering shaft to move in the longitudinal direction thereof, and means for coupling said steering shaft with said drag link and for conveying rotational movement of said steering shaft to linear movement of said drag link;

a case fixed to said body;

a first shaft rotatably supported in said case;

a second shaft rotatably supported in said case coaxially with said first shaft;

a first lever having one end connected to said first shaft and the other end coupled to said drag link;

a second lever having one end connected to said second shaft and the other end coupled to said tie rods;

a torsion bar interposed between said first and second shafts and interconnecting said first and second shafts;

torque detecting means interposed between said first and second shafts for detecting the steering torque applied from said steering wheel to said first shaft to generate a signal indicative of the detected torque;

a motor disposed in said case for applying an assistive torque to said second shaft;

a power supply for energizing said motor; and control means responsive to the signal from said torque detecting means for controlling the torque generated by said motor.

2. A motor-driven power steering unit according to claim 1, wherein said motor comprises a printed-coil motor having an armature board rotatably supported on said second shaft, further including a speed reducer operatively connecting said armature board to said second shaft.

3. A motor-driven power steering unit according to claim 2, wherein said torque detecting means comprises a differential transformer having a moving core movable axially of said first and second shafts dependent on a relative angular displacement between the first and second shafts.

* * * * *